United States Patent [19]

Dixon

[11] Patent Number: 5,538,315

[45] Date of Patent: Jul. 23, 1996

[54] DEFLECTOR FOR REDUCING ROCK DAMAGE TO A TRAILER HAVING FENDERS

[76] Inventor: Joseph S. Dixon, Box 155, Brant, Alberta, Canada, T0L 0L0

[21] Appl. No.: 230,559

[22] Filed: Apr. 20, 1994

[51] Int. Cl.⁶ ........................................... B62D 35/00
[52] U.S. Cl. ............................. 296/180.4; 296/180.1
[58] Field of Search ..................... 296/180.1, 180.4, 296/180.5, 37.1; 280/769, 770, 850, 851; 180/903

[56] References Cited

U.S. PATENT DOCUMENTS

| | | | |
|---|---|---|---|
| 2,119,072 | 5/1938 | Cohen | 280/850 |
| 2,367,824 | 1/1945 | King | 280/850 |
| 2,451,553 | 10/1948 | Hedquist et al. | 280/770 |
| 4,157,200 | 6/1979 | Johnson | 296/180.4 |
| 4,324,434 | 4/1982 | Friese | 280/851 |
| 4,607,878 | 8/1986 | Itoh | 280/850 |
| 4,715,648 | 12/1987 | Hensel | 280/850 |
| 4,840,400 | 6/1989 | Greenleaf | 280/770 |
| 5,181,734 | 1/1993 | Brown | 280/851 |
| 5,303,795 | 4/1994 | Buell | 280/769 |

FOREIGN PATENT DOCUMENTS

| | | | |
|---|---|---|---|
| 524557 | 12/1953 | Belgium | 296/37.1 |
| 2581943 | 11/1986 | France | 296/180.1 |
| 28436 | 6/1914 | United Kingdom | 296/37.1 |
| 373569 | 5/1932 | United Kingdom | 280/851 |
| 533579 | 2/1941 | United Kingdom | 296/37.1 |

*Primary Examiner*—Gary C. Hoge

[57] ABSTRACT

A method of reducing rock damage to a trailer having fenders is described. The method involves a single step of securing deflector shields to opposed sides of a trailer. Each deflector shield is angled outwardly and rearwardly from one of the opposed sides of the trailer to a peripheral edge of a fender. Each deflector shield extends to a height substantially equal to a top of the fender.

1 Claim, 3 Drawing Sheets

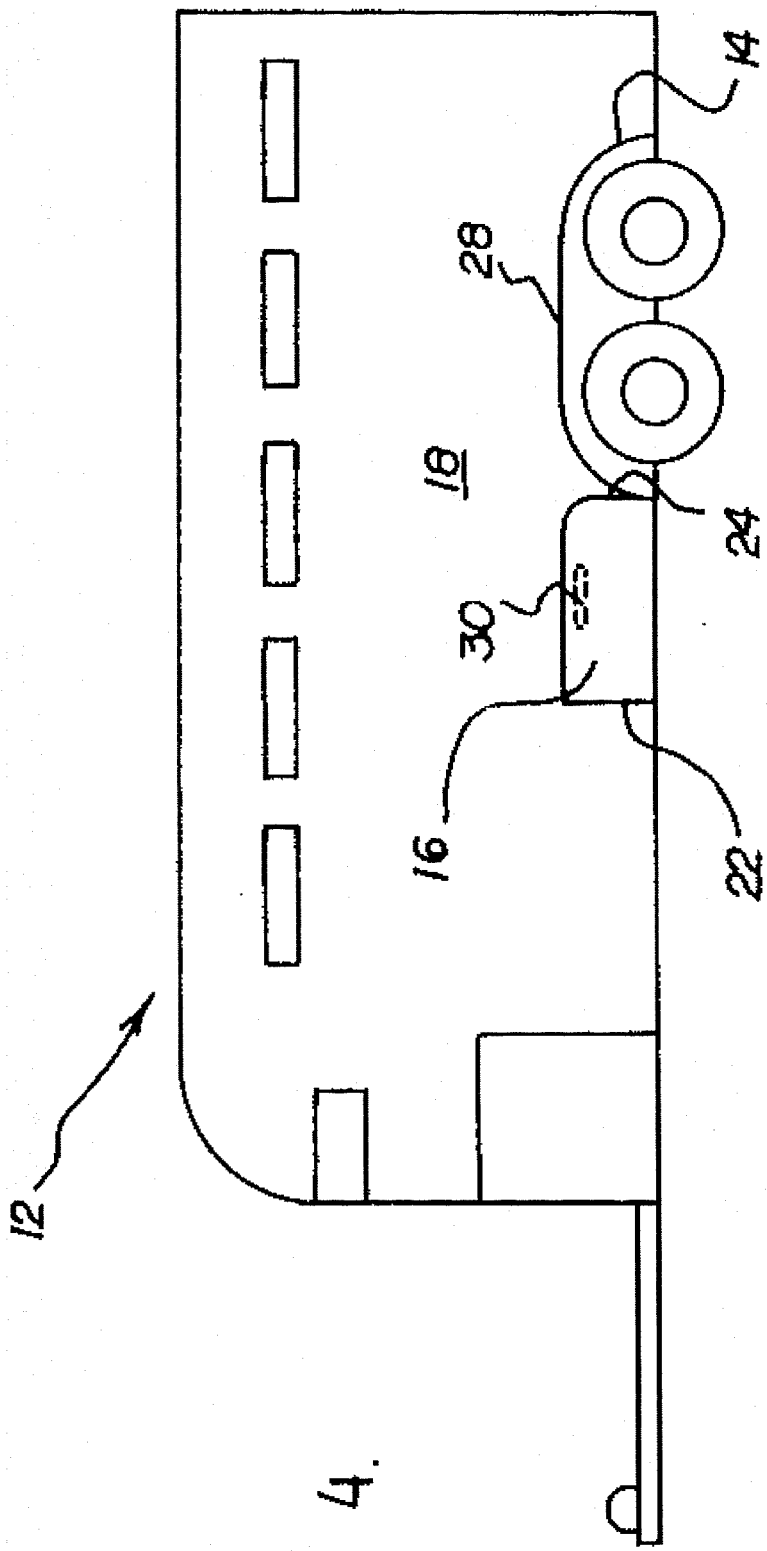

DEFLECTOR FOR REDUCING ROCK DAMAGE TO A TRAILER HAVING FENDERS

BACKGROUND OF THE INVENTION

A number of trailer styles have fenders. These fenders presently sustain damage from stones and other road debris thrown up by the wheels of the tow vehicle. A portion of the stones and road debris deflect off the fenders and also cause damage to the sides of the trailer.

SUMMARY OF THE INVENTION

What is required is a method of reducing rock damage to a trailer having fenders.

According to one aspect of the present invention there is provided a method of reducing rock damage to a trailer having fenders, comprising the step of securing deflector shields to opposed sides of a trailer. Each deflector shield is angled outwardly and rearwardly from one of the opposed sides of the trailer to a peripheral edge of a fender. Each deflector shield is of a height at least as high as a top of the fender.

With the method, as described above, the deflector shield deflects stones and road debris that would otherwise cause damage to the fenders and sides of the trailer. The method also has a number of secondary benefits. A more dynamic air flow is created in the area of the fenders that contributes of trailer stability and improves fuel economy. When driving in wet conditions, the deflector shield deflects the spray of slush and water away from the sides of the trailer.

According to another aspect of the present invention there is provided an improvement in a trailer having fenders which is comprised of deflector shields secured to opposed sides of the trailer. Each deflector shield is angled outwardly and rearwardly from one of the opposed sides of the trailer to a peripheral edge of a fender. Each deflector shield is of a height at least as high as a top of the fender.

BRIEF DESCRIPTION OF THE DRAWINGS

These and other features of the invention will become more apparent from the following description in which reference is made to the appended drawings, wherein:

FIG. 4 is a side elevation view of the trailer illustrated in FIG. 1.

DETAILED DESCRIPTION OF THE PREFERRED EMBODIMENT

The preferred method of reducing rock damage to a trailer having fenders will now be described with reference to FIGS. 1 through 4.

Figure 1:
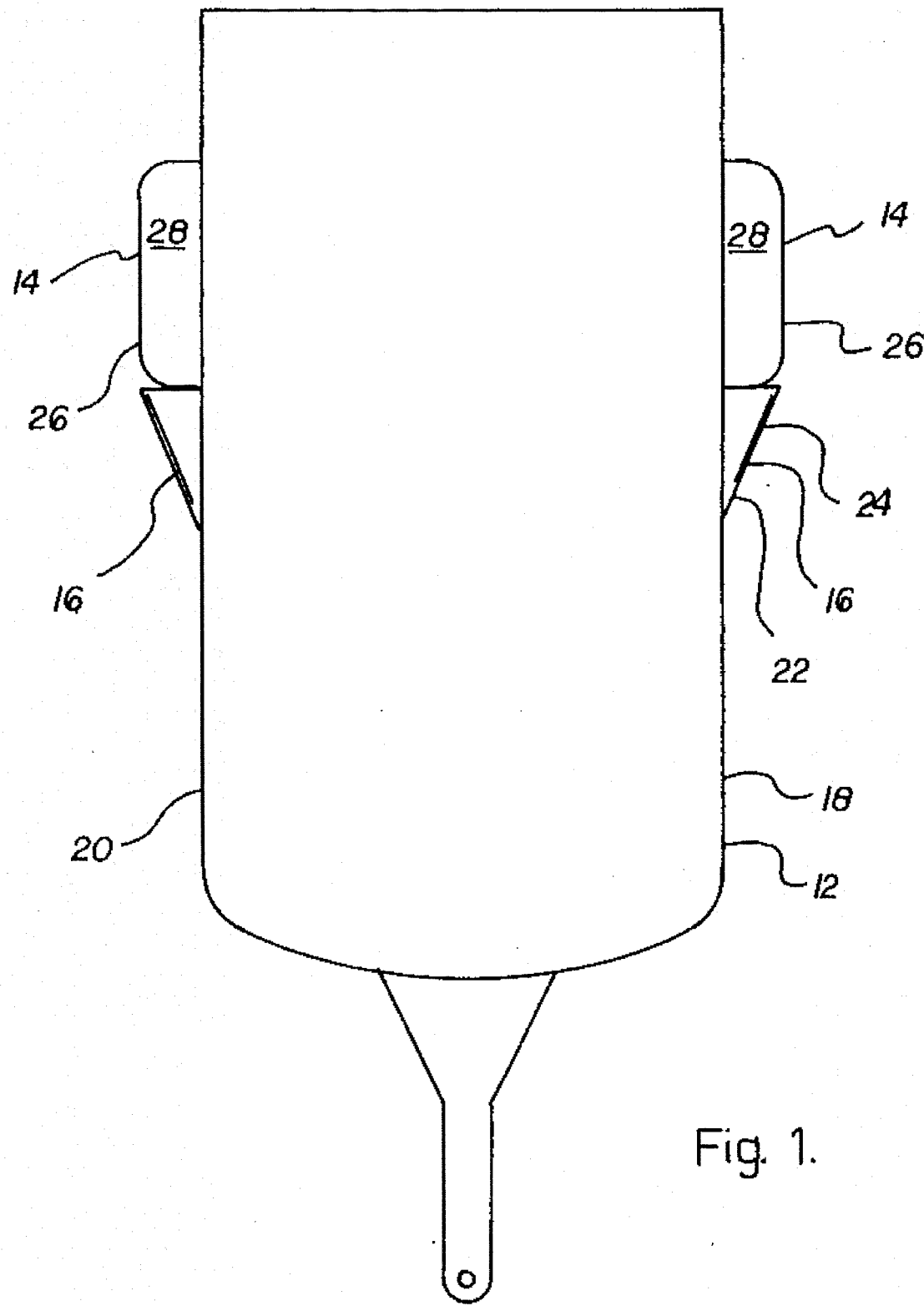
FIG. 1 is top plan view of a trailer which has been modified in accordance with the teachings of the present method.
Figure 2:
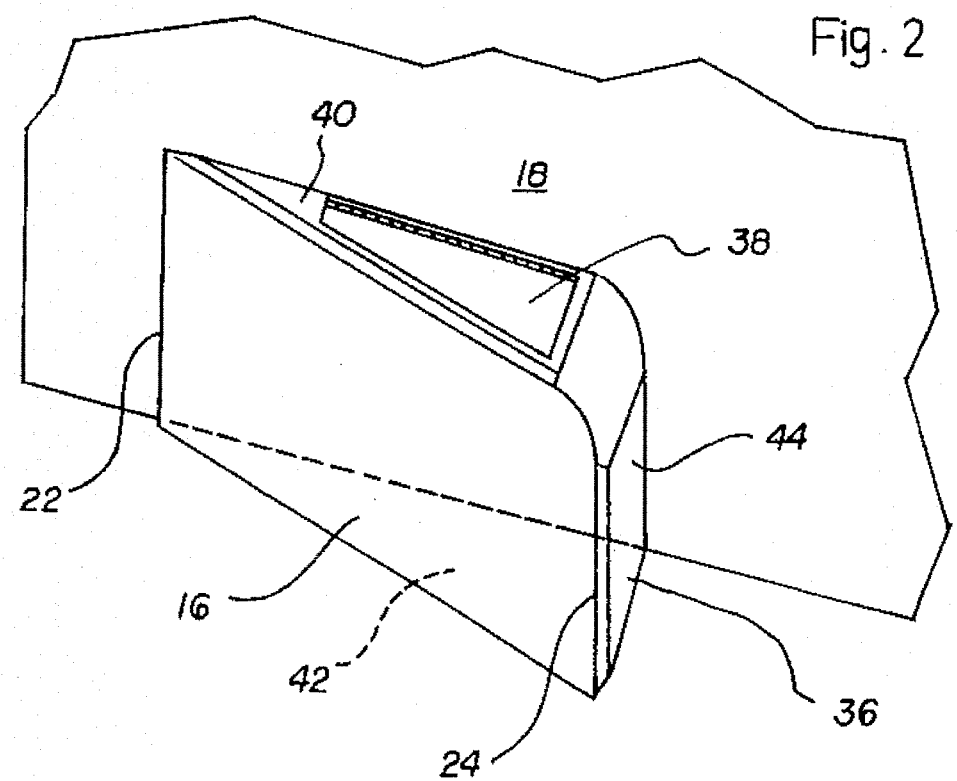
FIG. 2 is a detailed perspective view of a first embodiment of the present invention.
Figure 3:
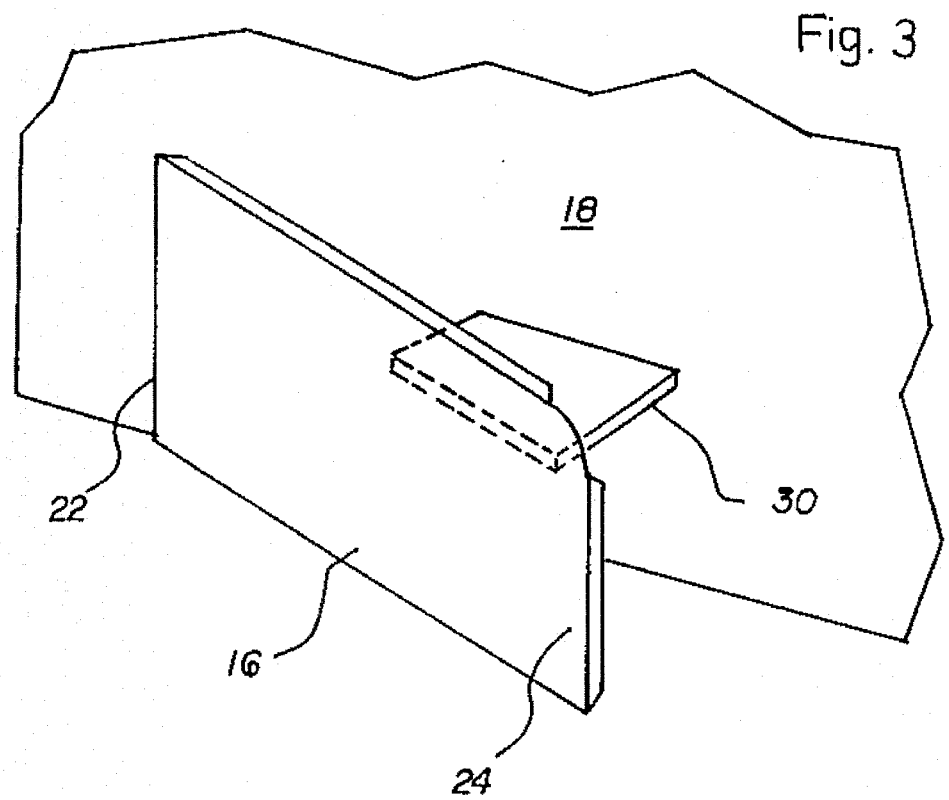
FIG. 3 is a detailed perspective view of a second embodiment of the present invention.

Referring to FIGS. 1 and 4, there is illustrated a trailer 12 having fenders 14. The method involves a single step of securing deflector shields 16 to opposed sides 18 and 20 of trailer 12. Each deflector shield 16 has a first end 22 and a second end 24. First end 22 of each deflector shield 16 is secured to opposed sides 18 and 20 of trailer 12. Each deflector shield 16 is angled outwardly and rearwardly from opposed sides 18 and 20 of trailer 12 to a peripheral edge 26 of one of fenders 14. Each deflector shield 16 extends to a height substantially equal to a top 28 of one of fenders 14. Deflector shields 16 serve to deflect stones and road debris away from fenders 14 and sides 18 and 20 of trailer 12. It is preferred that some reinforcing support be positioned between deflector shields 16 and opposed sides 18 and 20 of trailer 12. Referring to FIG. 2, there is illustrated a first embodiment of the present invention. With this embodiment, which is the preferred embodiment, the reinforcing support takes the form of a storage compartment 36. The storage compartment 36 is formed by a top transverse wall section 40, a bottom transverse wall section 42, and a rear wall section 44. This embodiment is preferred as storage compartment 36 makes use of the available space between deflector shields 16 and opposed sides 18 and 20. A hinged closure door 38 is provided to prevent the entry of dust and debris into storage compartment 36. Referring to FIG. 3, there is illustrated a second embodiment of the present invention. With this embodiment the reinforcing support merely takes the form of a transverse structural member 30.

The use and operation of deflector shields 16 should be readily apparent from the above description. Deflector shields 16 serve to deflect stones and road debris away from fenders 14 and sides 18 and 20 of trailer 12.

It will be apparent to one skilled in the art that modifications may be made to the illustrated embodiment without departing from the spirit and scope of the invention as hereinafter defined in the Claims. In particular, it will be apparent that although deflector shields 16 should extend at least as high as top 28 of fenders 14, it can be extended higher without adversely affecting the function of deflector shields 16.

The embodiments of the invention in which an exclusive property or privilege is claimed are defined as follows:

1. A deflector for a trailer having opposed sides with fenders protruding therefrom, the deflector comprising:

a deflector shield secured to each side of the trailer, each deflector shield angled outwardly and rearwardly from a respective side of the trailer to terminate adjacent to an outer peripheral edge of a respective fender, each deflector shield having top and bottom peripheral edges, and being of a height at least as high as a top of the respective fender, wherein a reinforcing support extends between each deflector shield and the respective side of the trailer, and wherein the reinforcing support comprises top and bottom transverse side wall sections extending from the top and bottom peripheral edges, respectively, of each deflector shield to the corresponding respective side of the trailer to form a storage compartment, and wherein an access opening is provided in a portion of each top transverse side wall section.

* * * * *